(12) United States Patent
Frey

(10) Patent No.: US 12,131,400 B2
(45) Date of Patent: Oct. 29, 2024

(54) IMAGE PROCESSING CIRCUITRY AND IMAGE PROCESSING METHOD FOR ASSOCIATING A USER USING INTEGRATED SENSORS THAT CONTROL IMAGE GENERATION

(71) Applicant: Sony Corporation, Tokyo (JP)

(72) Inventor: Matthias Frey, Stuttgart (DE)

(73) Assignee: Sony Corporation, Tokyo (JP)

(*) Notice: Subject to any disclaimer, the term of this patent is extended or adjusted under 35 U.S.C. 154(b) by 280 days.

(21) Appl. No.: 17/084,736

(22) Filed: Oct. 30, 2020

(65) Prior Publication Data
US 2021/0133910 A1 May 6, 2021

(30) Foreign Application Priority Data
Oct. 31, 2019 (EP) .................................... 19206443

(51) Int. Cl.
G06T 1/00 (2006.01)
G06V 40/10 (2022.01)
H04L 9/08 (2006.01)

(52) U.S. Cl.
CPC ............ *G06T 1/0021* (2013.01); *G06V 40/10* (2022.01); *H04L 9/0819* (2013.01); *H04L 9/0866* (2013.01)

(58) Field of Classification Search
CPC ...... G06T 1/0021; G06V 40/10; G06V 10/95; G06V 40/53; G06V 40/19; G06V 40/70; H04L 9/0819; H04L 9/0866
See application file for complete search history.

(56) References Cited

U.S. PATENT DOCUMENTS

| 2005/0144134 | A1* | 6/2005 | Hirano | H04H 60/19 358/1.14 |
| 2008/0089554 | A1* | 4/2008 | Tabankin | H04N 1/32213 348/E5.042 |
| 2013/0286248 | A1 | 10/2013 | Alfarano et al. | |
| 2014/0304505 | A1* | 10/2014 | Dawson | G06F 21/6227 713/165 |
| 2017/0140490 | A1 | 5/2017 | Leonard et al. | |
| 2020/0042789 | A1* | 2/2020 | Perälä | H01L 25/0753 |

FOREIGN PATENT DOCUMENTS

JP 2005045486 2/2005

* cited by examiner

*Primary Examiner* — Christopher Wait
(74) *Attorney, Agent, or Firm* — XSENSUS LLP

(57) ABSTRACT

The present disclosure generally pertains to image processing circuitry configured to:
obtain biometric feature data being indicative of at least one biometric feature of a user of an imaging device;
obtain image data from the imaging device used by the user; and
associate the biometric feature data with the image data for verifying the user.

20 Claims, 5 Drawing Sheets

IMAGE PROCESSING CIRCUITRY AND IMAGE PROCESSING METHOD FOR ASSOCIATING A USER USING INTEGRATED SENSORS THAT CONTROL IMAGE GENERATION

CROSS-REFERENCE TO RELATED APPLICATION

The present application claims priority to European Patent Application No. 19206443.4 filed in the European Patent Office on Oct. 31, 2019, the entire contents of which being incorporated herein by reference.

TECHNICAL FIELD

The present disclosure generally pertains to an image processing circuitry and an image processing method.

TECHNICAL BACKGROUND

Generally, authentication methods for approving a user to use an imaging device are known, e.g. by utilizing a fingerprint sensor for unlocking a camera.

However, in such devices it may not necessarily be ensured that the same user who unlocked the device is the user using the device, since, for example, the unlocked device could be used by another user.

Moreover, methods for indicating a validity of an image are known, for example by adding metadata (typically indicating a position, a time, and the like) to image data, such that, for example, an image manipulation may be recognized by reading out the metadata.

Although there exist techniques for an authenticity test of a user of a camera or an authenticity test of an image, it is generally desirable to provide an image processing circuitry and an image processing method.

SUMMARY

According to a first aspect, the disclosure provides an image processing circuitry configured to: obtain biometric feature data being indicative of at least one biometric feature of a user of an imaging device; obtain image data from the imaging device used by the user; and associate the biometric feature data with the image data for verifying the user.

According to a second aspect, the disclosure provides an image processing method comprising: obtaining biometric feature data being indicative of at least one biometric feature of a user of an imaging device; obtaining image data from the imaging device used by the user; and associating the biometric feature data with the image data for verifying the user.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
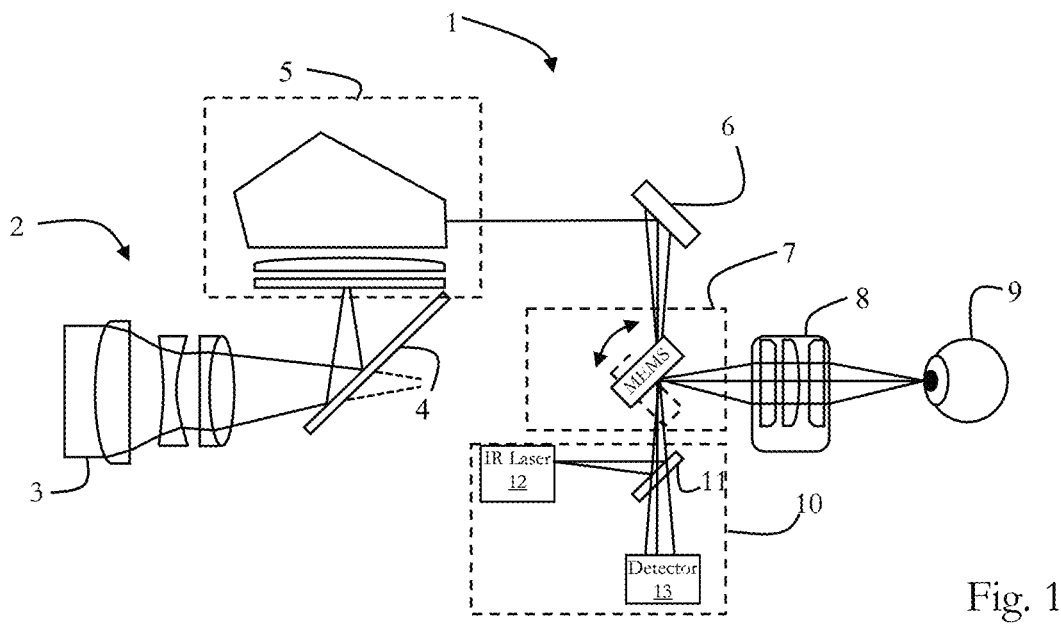
FIG. 1 depicts an embodiment of an imaging device according to the present disclosure configured to perform a retina scan.

Before a detailed description of the embodiments under reference of FIG. 1 is given, general explanations are made.

As mentioned in the outset, it has been recognized that it is generally desirable to prove an authenticity of a user of an imaging device or to prove an authenticity of an image itself. For example, it may be possible that a photograph taken from a scene may have been manipulated before a publication, whereas, depending on a context (e.g. a newspaper), it is generally desirable to publish authentic photographs or images.

It has been recognized that known methods may not in every case be save from a manipulation, since, for example, a data structure of metadata of an added image may be simple, and, thus, it may be easy to forge the metadata, such that a manipulation of an image may not always be recognized based on a reading out of the metadata according to known methods.

It has further been recognized that data which is unique to a user (e.g. biometric data) may provide a higher barrier in terms of a manipulation of an image.

Therefore, some embodiments pertain to an image processing circuitry configured to: obtain biometric feature data being indicative of at least one biometric feature of a user of an imaging device; obtain image data from the imaging device used by the user; associate the biometric feature data with the image data for verifying the user.

The image processing circuitry may include a single element or a plurality of elements, such as a processor, which may include a CPU (central processing unit), GPU (graphic processing unit), FPGA (field programmable gate array), or, as mentioned multiple of such element, wherein also combinations thereof may be envisaged. Moreover, the image processing circuitry may include a computer, a server, or multiple computers or servers, and the like.

The image processing circuitry may be included in an imaging device, such as a photo or video camera (e.g. single-lens reflex camera, digital camera, and the like), a mobile phone, a tablet, a computer, a server, combinations thereof, and the like.

The biometric feature data may include data or a data structure, which may be based on a recognition, a scan, and the like, of a biometric feature of a user, wherein the biometric feature data may be obtained by an imaging device associated with or including the image processing circuitry, from a memory (e.g. a hard drive) included in the imaging device, or from a remote device, such as a server, and the like, on which the biometric feature data is saved.

Moreover, the biometric feature data may be obtained by the imaging device, in some embodiments, in which the imaging device may have a biometric feature unit, which may be configured to perform a scan of a biometric feature of the user before or while the user uses the imaging device, and which may be further configured to generate the biometric feature data from the scan, and the like.

Hence, the biometric feature data may be obtained during (or before or after) an image acquisition, before the imaging device is used or initialized, such that, in some embodiments, the biometric feature data may be utilized for unlocking the imaging device, wherein the obtained biometric feature data may be compared with biometric feature data being saved on a memory, and the like.

In some embodiments, the biometric feature data may be obtained once before a predetermined imaging time period is started, such that after the predetermined imaging time period, the biometric feature data may be obtained again. However, in some embodiments, the biometric feature data may be obtained once before an image acquisition process (which may be a basis for a plurality of images) and after a predetermined amount of time of no image acquisition, the obtaining of the biometric feature data may be initiated again, such that a risk of a different user using the imaging device may be minimized or that the different user may be recognized, and the like.

The image processing circuitry may be actively configured to acquire the biometric feature data, for example by a biometric feature unit (which may also be included in the image processing circuitry), as discussed, or by issuing a request to a remote device. Moreover, the image processing circuitry may be passively configured to receive the biometric feature data, for example from a remote device or from a biometric feature unit (which may, in such embodiments, not be included in the image processing circuitry).

Hence, obtaining biometric feature data may include an active acquisition of the biometric feature data and/or a passive reception of the biometric feature data.

The biometric feature data may be indicative of at least one biometric feature of the user of the imaging device.

Hence, from the biometric feature data, it may be concluded to one or more biometric features, such as a fingerprint, a face identification pattern, a retina pattern, an iris pattern, and the like.

Thus, the biometric feature unit may include multiple sensors for obtaining the at least one biometric feature of the user.

For example, a fingerprint sensor may be placed on or associated with a release button of an imaging device, whereas a retinal or iris scanner may be associated with or integrated in an eyepiece or a viewfinder of the imaging device, and the like.

The sensors may be configured to perform a fingerprint scan, a face scan, a retina scan, an iris scan, and the like, such that the at least one biometric feature is based on at least one of these, without limiting the present disclosure in that regard, since, as discussed, the biometric feature data may be acquired from a remote device, a memory, and the like, as well, such that, in some embodiments, it may be sufficient that the biometric feature data is based on at least one of a fingerprint scan, a face scan, a retina scan, and an iris scan, without the need for specific sensors included in the imaging device.

FIG. 1 depicts an embodiment of an imaging device 1, which is configured to perform a retina scan for obtaining the biometric feature data.

The imaging device 1 includes an objective 2, wherein symbolically light paths 3 are depicted with straight lines, as it is commonly known.

The light path includes a beam splitter 4 reflecting (hypothetical) light onto a viewfinder 5 configured to transmit the light onto a mirror 6 reflecting the light onto a microelectromechanical system 7 (MEMS), which is configured to be switched between two states (indicated with a double arrow). In a first state, the MEMS 7 is configured to block light deriving from the objective (and the viewfinder, and so on), and in a second state, the MEMS 7 is configured to reflect light deriving from the objective (and the viewfinder, and so on), such that, in the second state the light from the objective is reflected onto an ocular 8 (or eyepiece), in which a user 9 may potentially look.

The imaging device 1 further includes a retina scanner 10 including a semi-transparent mirror 11, an infrared laser 12, and a detector 13.

The infrared laser 12 is configured to emit light of a low frequency spectrum (e.g. infrared) onto the semi-transparent mirror 11, which is configured to reflect the light onto the MEMS 7 being, in the first state, configured to reflect the light from the retina scanner 10 onto the ocular 8.

Typically, the light of the infrared laser 12 may not be perceived by the human eye. This light (or beam of light) may typically propagate on an optical path through the human eye (which is similar for each human), and finally being incident on the retina.

Generally, retinal blood vessels may be more absorbent of infrared light than other parts of the human eye, such that the blood vessels of the retina may be recognized, and the amount of reflection of the infrared light varies during a retina scan. Thereby a pattern of a variation of a reflection may be recognized (in the following: retina pattern), which may be converted into computer code (i.e. into biometric feature data) and stored in a data base.

The detector 13 is configured to detect a retina pattern based on a reflection of the infrared light emitted by the infrared laser 12 from the retina of the user 9 being transmitted through the semi-permeable mirror 11.

In the second state, the MEMS 7 is configured to block the light from the retina scanner 10.

In other words, the MEMS 7 has a reflective side and an absorptive side, and the reflective side establishes a light path from the retina scanner 10 with the ocular 8, when the MEMS 7 is in the first state, wherein the light deriving from the objective 2 is blocked when the MEMS 7 is in the first state.

Moreover, the reflective side of the MEMS 7 is configured to establish a light path between the objective 2 and the ocular 8, when the MEMS 7 is in the second state, wherein light deriving from the retina scanner 10 is blocked, i.e. the imaging device 1 is configured to be switched between a retina scanning mode and a photography mode (or imaging mode).

However, typically there is no need to drive the retina scanner 10 when the MEMS 7 is in the second state, without limiting the present disclosure in that regard.

Figure 2:
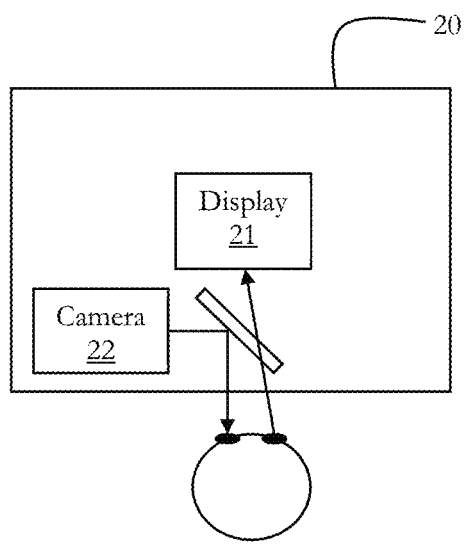
FIG. 2 depicts an embodiment of an imaging device according to the present disclosure configured to perform an iris scan.

FIG. 2 depicts an embodiment of an imaging device 20, which is configured to perform an iris scan for obtaining the biometric feature data.

The imaging device 20 includes a display 21 configured to display an acquired image. Furthermore, the imaging device 20 includes a camera 22 configured to scan and recognize an iris (of one or two eyes) of a user.

In order to recognize the iris, a pattern-recognition technique may be utilized on a sequence of images acquired by the camera 22. The camera 22 may use infrared-illumination for acquiring an image sequence of the iris, such that a detail-rich, intricate image of the iris can be acquired and the pattern may be recognized.

Moreover, the camera 22 may use an eye-tracking technique to monitor an eye while the user is looking through a viewfinder in order to perform an iris scan.

Furthermore, as discussed above, a face-recognition may be performed, as well, either additionally to another biometric measurement or, in embodiments, in which the imaging device does not include a viewfinder, detached from iris or retina recognition.

Moreover, the image processing circuitry may be configured to obtain image data from the imaging device used by the user.

The image data may be indicative of an image which is captured or acquired based on an image acquisition process, as discussed above. The image data may be generated by an image acquisition unit of the imaging device and provided to the image processing circuitry in that the image processing circuitry actively acquires the image data and/or in that the image processing circuitry receives the image data passively.

The image processing circuitry may be configured to associate the biometric feature data with the image data for verifying the user.

The verification of the user may be indicative for a verification of an authenticity of the image. For example, it may be required, in certain situations, to prove the authenticity of an image, for example for a newspaper, which may have to rely on a reliability of a journalist to not tamper a photograph, and the like, such that with a verification of the authenticity of the image according to the present disclosure, a risk of a tampering, manipulating, and the like, of the image, is minimized.

Moreover, the user itself may be verified, such that it may be ensured that the imaging device may be only used by an approved user, and/or that images which are taken with the imaging device are assigned to each user, in the case of a plurality of users.

Associate may in this context include a connecting of the image data and the biometric feature data, such that a manipulation of the image may be recognized by reading out the image data and/or such that the image data may be encrypted based on the biometric feature data.

In some embodiments, the image processing circuitry is further configured watermark the image data with the biometric feature data, thereby associating the biometric feature data with the image data.

A watermark may be added on a basis of a code added to the image data, such that one or a plurality of data points of the image data may be indicative for image information (e.g. a color) and for the biometric feature, such that the biometric feature may not be visible on the image itself.

The watermark may be derived from a private key (from a public/private key pair), which may be generated based on the biometric feature data, such that the image data may further be encrypted with the biometric feature data, without limiting the present disclosure in that regard.

The private key may be stored on a storage or a memory of an imaging device, whereas the public key may be transmitted to a remote (centralized) server or on a decentralized server or network, such as a blockchain, and the like.

Hence, in some embodiments, the image processing circuitry is further configured to encrypt the image data based on the biometric feature data, thereby generating encrypted image data, with a predetermined encryption algorithm, thereby associating the biometric feature data with the image data.

The predetermined encryption algorithm may be any known encryption algorithm, such as a symmetric or asymmetric encryption algorithm, or a combination of multiple encryption algorithms, and the like.

The encrypted image data may include a data structure similar to the image data and/or the biometric feature data or it may be based on a different data structure, as well.

In some embodiments, the image processing circuitry is further configured to generate a key for decrypting the image data based on the predetermined encryption algorithm, as discussed herein, wherein the key is not limited to a key from a public/private key pair, since, as discussed, also symmetric encryption algorithm may be envisaged according to the present disclosure.

The decrypting of the image data may be performed by a decryption circuitry, e.g. of a server, a computer, or any other terminal device, to which the encrypted image data may be transmitted, which may be used by a (remote) user intending to view the image taken by the user using the imaging device, and the like.

In some embodiments, the key is based on a public and private key pair, as discussed herein.

It should be noted that an encryption of the image data or the generating of the encrypted image data is not limited to watermarking since any signing or encryption of image data may be envisaged, as well, such as a hash.

Therefore, in some embodiments, the image processing circuitry is further configured to generate a hash based on the image data.

A hash may pertain to a function, which may encode the image data to a predetermined data size.

Hence, the image processing circuitry may be configured to utilize a hash function which may be applied on the image data for generating a hash value, and the like.

In some embodiments, the image processing circuitry is further configured to generate metadata based on the hash.

The metadata (or meta information) may be added to the image data, as it is generally known.

In some embodiments, the image processing circuitry is further configured to merge the metadata with the biometric feature data, thereby associating the biometric feature data with the image data.

The merging may include a signing of the biometric feature data with the hash or a combining of the private key derived from the biometric feature data with the hash derived from the image data.

In some embodiments, the metadata is further based on at least one of a position of the user, a point of time, and an identity of the imaging device.

The position of the user may be obtained with a position sensor, such as a GPS sensor (Global Positioning System), which may be included in the imaging device or in a remote device associated with the user, and the like, such that the imaging device may obtain the position of the user from the remote device.

The point of time may be obtained from a server, from a remote device, from an internal clock of the imaging device, and the like.

The identity of the imaging device may be obtained from an internal programming of the imaging device and may be defined in a production process of the imaging device, as it is generally known.

Some embodiments pertain to an image processing method including: obtaining biometric feature data being indicative of at least one biometric feature of a user of an imaging device; obtaining image data from the imaging device used by the user; and associating the biometric feature data with the image data for verifying the user.

The image processing method may be performed with an image processing circuitry according to the present disclosure.

In some embodiments, the at least one biometric feature is based on at least one of a fingerprint scan, a face scan, a retina scan, and an iris scan, as discussed herein. In some embodiments, the image processing method further includes watermarking the image data with the biometric feature data, thereby associating the biometric feature data with the image data, as discussed herein. In some embodiments, the image processing method further includes encrypting the image data based on the biometric feature data, thereby generating encrypted image data, with a predetermined encryption algorithm, thereby associating the biometric feature data with the image data, as discussed herein. In some embodiments, the image processing method further includes generating a key for decrypting the image data based on the predetermined encryption algorithm. In some embodiments, the key is based on a public and private key pair, as discussed herein. In some embodiments, the image processing method further includes generating a hash based on the biometric feature data, as discussed herein. In some embodiments, the image processing method further includes generating metadata based on the hash, as discussed herein. In some embodiments, the image processing method further includes merging the metadata with the image data, thereby associating the biometric feature data with the image data, as discussed herein. In some embodiments, the metadata is further based on at least one of a position of the user, a point of time, and an identity of the imaging device, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 3:
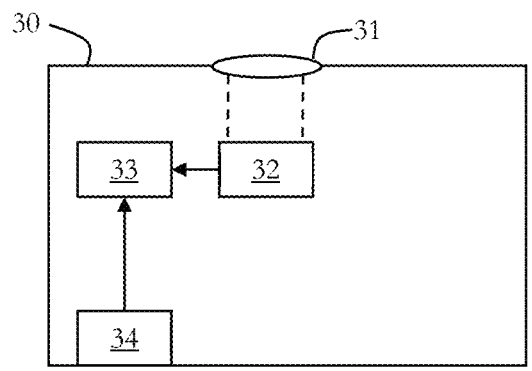
FIG. 3 depicts a block diagram of an imaging device according to the present disclosure.

In FIG. 3, there is depicted, in a block diagram, an imaging device 30 according to the present disclosure.

The imaging device 30 includes an optical stack 31, which is configured to direct light onto an image acquisition unit 32 including a plurality of pixels (not depicted) and further including image acquisition circuitry (not depicted) configured to generate image data, as discussed herein.

The imaging device 30 further includes image processing circuitry 33 configured to obtain the image data from the image acquisition unit 32, to obtain biometric feature data from a biometric feature unit 34 including a retina scanner, as discussed herein, wherein the biometric feature unit 34 is further included in the imaging device 30.

The image processing circuitry 33 is further configured to associate the biometric feature data with the image data, as discussed herein.

It should be noted that, although not depicted, the imaging device 1 as well as the imaging device 20, which are described with reference to FIGS. 1 and 2, may also include image processing circuitry according to the present disclosure.

Figure 4:
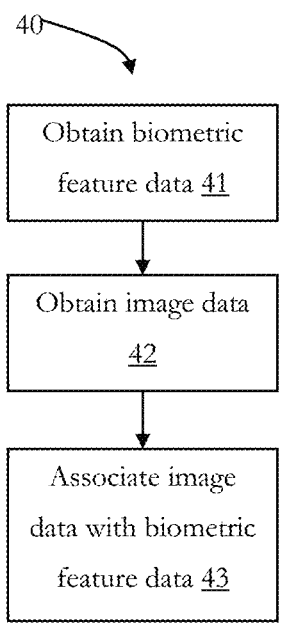
FIG. 4 depicts a block diagram of an image processing method according to the present disclosure.

FIG. 4 depicts, in a block diagram, an image processing method 40 according to the present disclosure.

In 41, biometric feature data is obtained, as discussed herein.

In 42, image data is obtained, as discussed herein.

In 43, the image data is associated with the biometric feature data, as discussed herein.

As discussed, in some embodiments, the associating of the biometric feature data and the image data is carried out by watermarking and/or by encrypting the image data based on the biometric feature data, thereby generating encrypted image data, with a predetermined encryption algorithm and/or by generating a hash based on the biometric feature data.

Figure 5:
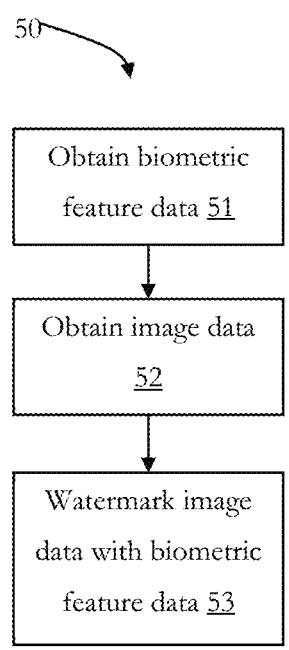
FIG. 5 depicts a further embodiment of an image processing method according to the present disclosure.

FIG. 5 depicts an image processing method 50 in a block diagram, in which a watermark is added to the image data.

In 51, biometric feature data is obtained, as discussed herein.

In 52, image data is obtained, as discussed herein.

In 53, the image data is watermarked with the biometric feature data, as discussed herein.

Figure 6:
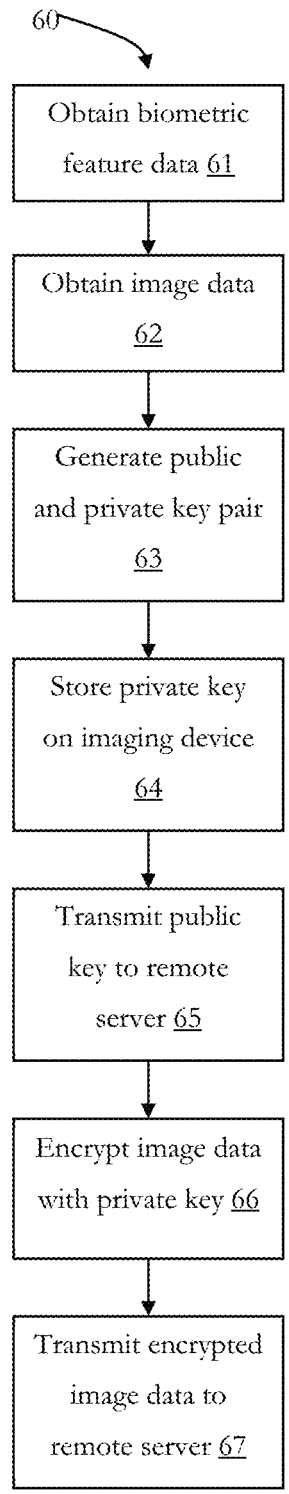
FIG. 6 depicts a further embodiment of an image processing method according to the present disclosure.

FIG. 6 depicts an image processing method 60 in a block diagram, in which the image data is encrypted based on the biometric feature data.

In 61, biometric feature data is obtained, as discussed herein.

In 62, image data is obtained, as discussed herein.

In 63, a public and private key pair is generated from the biometric feature data.

In 64, the private key is stored on an imaging device according to the present disclosure.

In 65, the public key is transmitted to a remote server.

In 66, the image data is encrypted with the private key, thereby encrypted image data is generated.

In 67, the encrypted image data is transmitted to the remote server.

Figure 7:
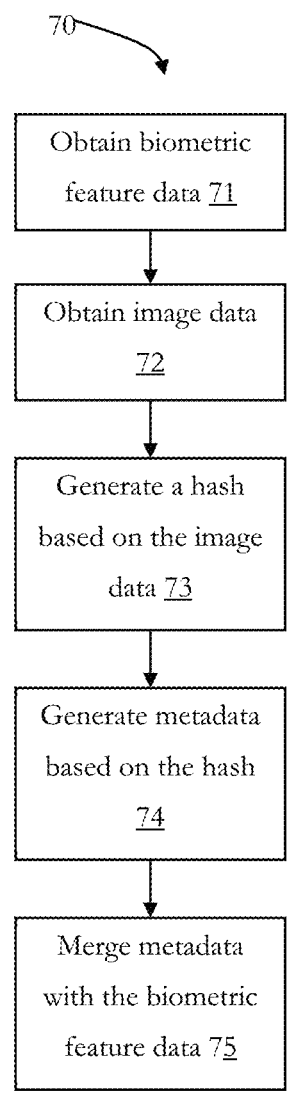
FIG. 7 depicts a further embodiment of an image processing method according to the present disclosure.

FIG. 7 depicts an image processing method 70 in a block diagram, in which the biometric feature data is associated with the image data based on a hash generated from the image data.

In 71, biometric feature data is obtained, as discussed herein.

In 72, image data is obtained, as discussed herein.

In 73, a hash is generated based on the image data, as discussed herein.

In 74, metadata is generated based on the hash, as discussed herein.

In 75, the metadata is merged with the biometric feature data, as discussed herein.

It should be noted that, as discussed, the methods which are described with reference to FIGS. 5 to 7 may also be combined, e.g. a watermark may be added based on a public and private key pair, as well as a hash may be generated, and the like, such that the method 50 may be combined with the method 60 and/or with the method 70, or that the method 60 may be combined with the method 50 and/or the method 70, or that the method 70 may be combined with the method 50 and/or the method 60. However, each of the methods 50 to 70 may also be applied without a combination with other methods according to the present disclosure.

It should be recognized that the embodiments describe methods with an exemplary ordering of method steps. The specific ordering of method steps is however given for illustrative purposes only and should not be construed as binding. For example the ordering of 41 and 41 in the embodiment of FIG. 4 (as well as 51 and 52 of FIG. 5, 61 and 62 of FIG. 6, and 71 and 72 of FIG. 7) may be exchanged. Also, the ordering of 64, 65 and 66 in the embodiment of FIG. 6 may be exchanged. Further, also the ordering of 62 and 65 in the embodiment of FIG. 6 may be exchanged. Other changes of the ordering of method steps may be apparent to the skilled person.

Please note that the division of the control imaging device 30 into units 32 to 34 is only made for illustration purposes and that the present disclosure is not limited to any specific division of functions in specific units. For instance, the units 32 to 34 could be implemented by a respective programmed processor, field programmable gate array (FPGA) and the like.

A method for controlling an image processing circuitry, such as the image processing circuitry 33 discussed above, is described under reference of FIGS. 4 to 7. The method can also be implemented as a computer program causing a computer and/or a processor, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing circuitry configured to:
 obtain biometric feature data being indicative of at least one biometric feature of a user of an imaging device;
 obtain image data from the imaging device used by the user; and
 associate the biometric feature data with the image data for verifying the user.

(2) The image processing circuitry of (1), wherein the at least one biometric feature is based on at least one of a fingerprint scan, a face scan, a retina scan, and an iris scan.

(3) The image processing circuitry of any one of (1) and (2) further configured to:
 watermark the image data with the biometric feature data, thereby associating the biometric feature data with the image data.

(4) The image processing circuitry of any one of (1) to (3) further configured to:
 encrypt the image data based on the biometric feature data, thereby generating encrypted image data, with a predetermined encryption algorithm, thereby associating the biometric feature data with the image data.

(5) The image processing circuitry of (4), further configured to:
 generate a key for decrypting the image data based on the predetermined encryption algorithm.

(6) The image processing circuitry of (5), wherein the key is based on a public and private key pair.

(7) The image processing circuitry of any one of (1) to (6) further configured to:
 generate a hash based on the image data.

(8) The image processing circuitry of (7) further configured to:
 generate metadata based on the hash.

(9) The image processing circuitry of (8) further configured to:
 merge the metadata with the biometric feature data, thereby associating the biometric feature data with the image data.

(10) The image processing circuitry of any one of (8) and (9), wherein the metadata is further based on at least one of a position of the user, a point of time, and an identity of the imaging device.

(11) An image processing method comprising
 obtaining biometric feature data being indicative of at least one biometric feature of a user of an imaging device;
 obtaining image data from the imaging device used by the user; and
 associating the biometric feature data with the image data for verifying the user.

(12) The image processing method of (11), wherein the at least one biometric feature is based on at least one of a fingerprint scan, a face scan, a retina scan, and an iris scan.

(13) The image processing method of any one of (11) and (12) further comprising
 watermarking the image data with the biometric feature data, thereby associating the biometric feature data with the image data.

(14) The image processing method of any one of (11) to (13) further comprising:
 encrypting the image data based on the biometric feature data, thereby generating encrypted image data, with a predetermined encryption algorithm, thereby associating the biometric feature data with the image data.

(15) The image processing method of (14), further comprising:
 generating a key for decrypting the image data based on the predetermined encryption algorithm.

(16) The image processing method of (15), wherein the key is based on a public and private key pair.

(17) The image processing method of any one of (11) to (16) further comprising:
 generating a hash based on the biometric feature data.

(18) The image processing method of (17) further comprising:
 generating metadata based on the hash.

(19) The image processing method of (18) further comprising:
 merging the metadata with the image data, thereby associating the biometric feature data with the image data.

(20) The image processing method of any one of (18) and (19), wherein the metadata is further based on at least one of a position of the user, a point of time, and an identity of the imaging device.

(21) A computer program comprising program code causing a computer to perform the method according to any one of (11) to (20), when being carried out on a computer.

(22) A non-transitory computer-readable recording medium that stores therein a computer program product, which, when executed by a processor, causes the method according to any one of (11) to (20) to be performed.

The invention claimed is:

1. An image processing circuitry configured to:
 when a user is taking an image using an imaging device, automatically obtain biometric feature data being indicative of at least one biometric feature of the user of the imaging device from sensors integrated into a button of the imaging device used for taking an image, wherein the at least one biometric feature is based on a fingerprint scan;
 after a predetermined imaging time period, automatically obtain biometric feature data being indicative of at least one biometric feature of a user of the imaging device when the user is taking an image using the imaging device from the sensors integrated into the button;

obtain image data from the imaging device used by the user; and associate the biometric feature data with the image data for verifying the user for each image taken.

2. The image processing circuitry of claim 1 further configured to:

watermark the image data with the biometric feature data, thereby associating the biometric feature data with the image data.

3. The image processing circuitry of claim 1 further configured to:

encrypt the image data based on the biometric feature data, thereby generating encrypted image data, with a predetermined encryption algorithm, thereby associating the biometric feature data with the image data.

4. The image processing circuitry of claim 3, further configured to:

generate a key for decrypting the image data based on the predetermined encryption algorithm.

5. The image processing circuitry of claim 4, wherein the key is based on a public and private key pair.

6. The image processing circuitry of claim 1 further configured to:

generate a hash based on the image data.

7. The image processing circuitry of claim 6 further configured to:

generate metadata based on the hash.

8. The image processing circuitry of claim 7 further configured to:

merge the metadata with the biometric feature data, thereby associating the biometric feature data with the image data.

9. The image processing circuitry of claim 7, wherein the metadata is further based on at least one of a position of the user, a point of time, and an identity of the imaging device.

10. An image processing method comprising:

when a user is taking an image using the imaging device, automatically obtaining biometric feature data being indicative of at least one biometric feature of the user of the imaging device when the user is taking an image using the imaging device from sensors integrated into a button of the imaging device used for taking an image, wherein the at least one biometric feature is based on a fingerprint scan;

after a predetermined imaging time period, automatically obtaining biometric feature data being indicative of at least one biometric feature of a user of the imaging device when the user is taking an image using the imaging device from sensors integrated into the button;

obtaining image data from the imaging device used by the user; and associating the biometric feature data with the image data for verifying the user for each image taken.

11. The image processing method of claim 10 further comprising:

watermarking the image data with the biometric feature data, thereby associating the biometric feature data with the image data.

12. The image processing method of claim 10 further comprising:

encrypting the image data based on the biometric feature data, thereby generating encrypted image data, with a predetermined encryption algorithm, thereby associating the biometric feature data with the image data.

13. The image processing method of claim 12, further comprising:

generating a key for decrypting the image data based on the predetermined encryption algorithm.

14. The image processing method of claim 13, wherein the key is based on a public and private key pair.

15. The image processing method of claim 10 further comprising:

generating a hash based on the biometric feature data.

16. The image processing method of claim 15 further comprising:

generating metadata based on the hash.

17. The image processing method of claim 16 further comprising:

merging the metadata with the image data, thereby associating the biometric feature data with the image data.

18. The image processing method of claim 16, wherein the metadata is further based on at least one of a position of the user, a point of time, and an identity of the imaging device.

19. The image processing method of claim 10 further comprising:

after a predetermined amount of time of no images being taken, obtaining the biometric feature data again from the release button while the user is taking an image using the imaging device.

20. The image processing circuitry of claim 1 further configured to:

after a predetermined amount of time of no images being taken, obtain the biometric feature data again from the release button while the user is taking an image using the imaging device.

* * * * *